United States Patent Office 3,561,126
Patented Feb. 9, 1971

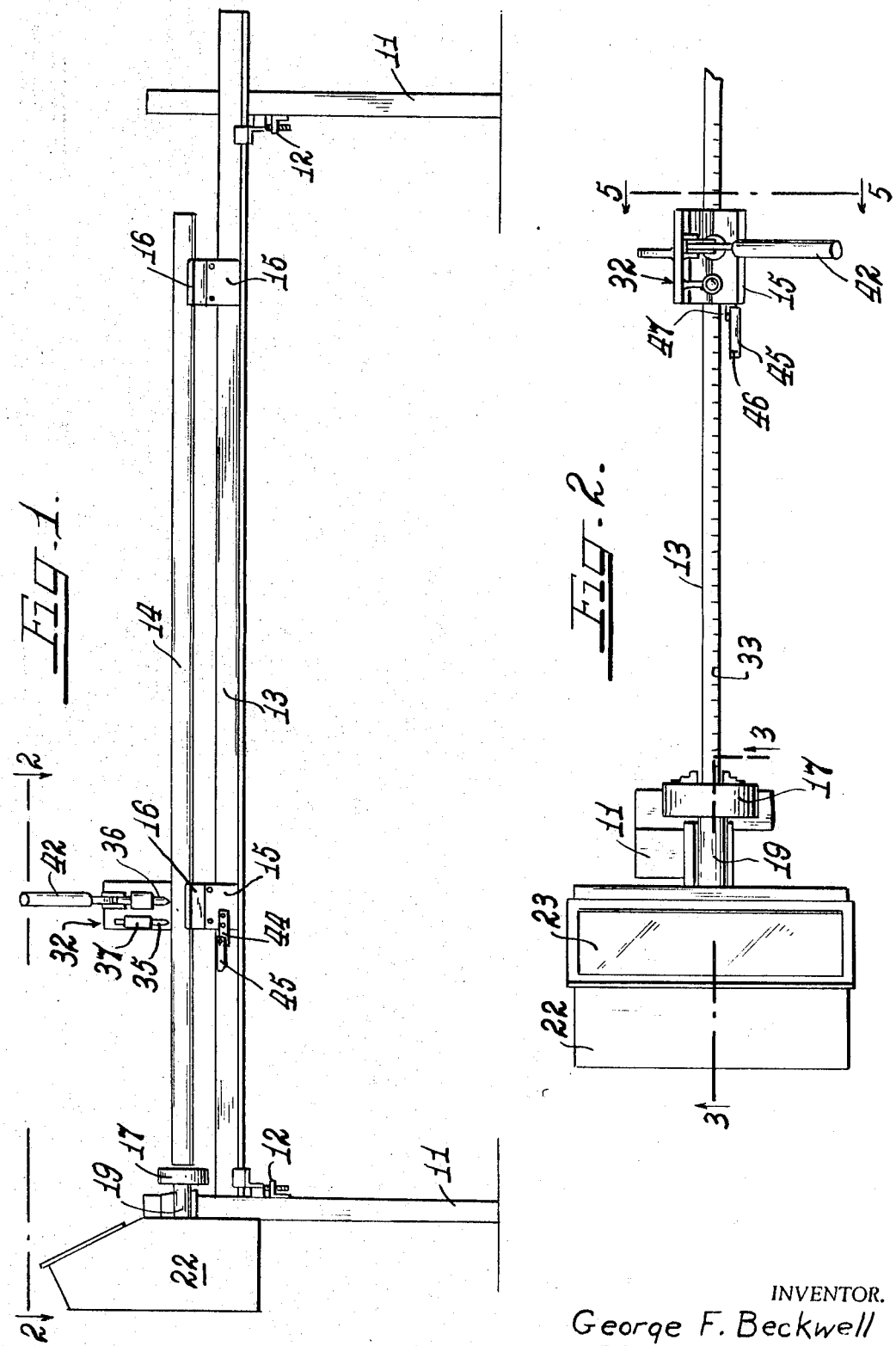

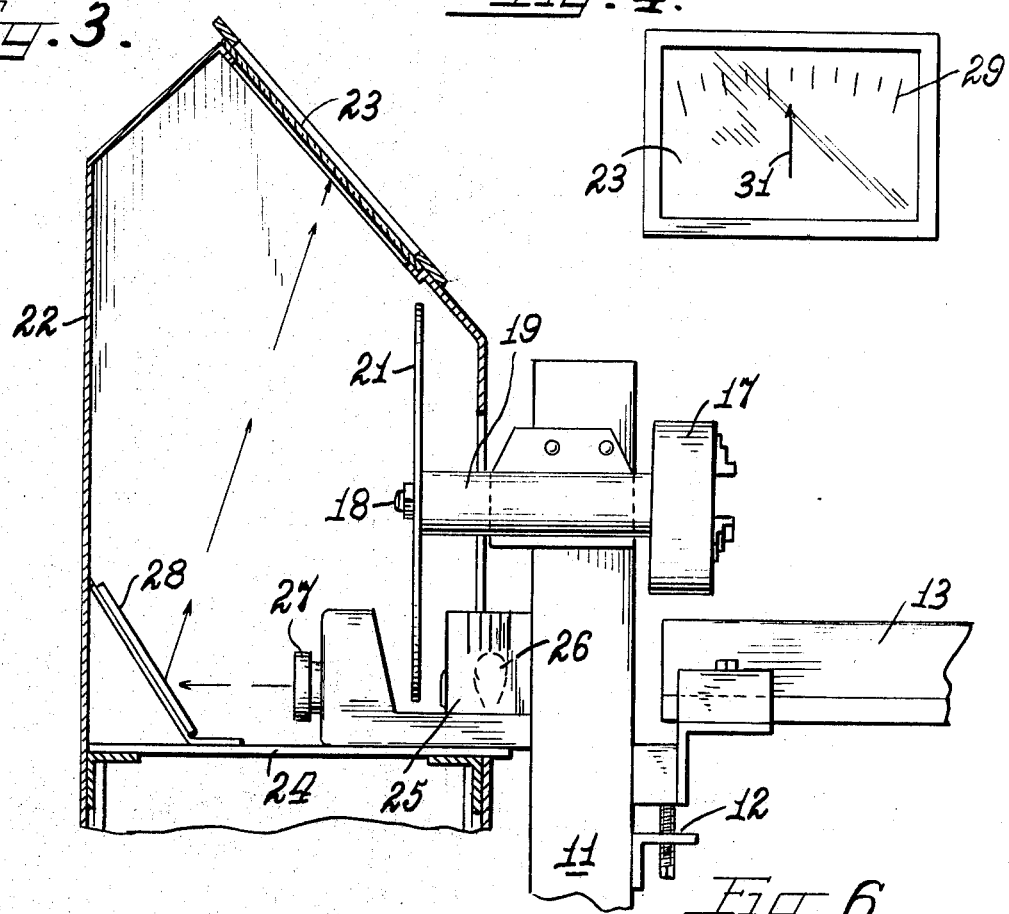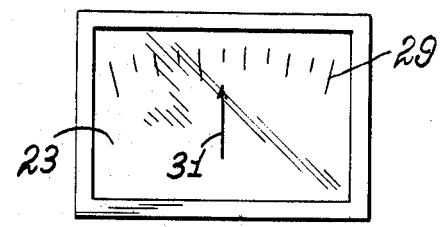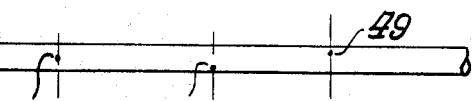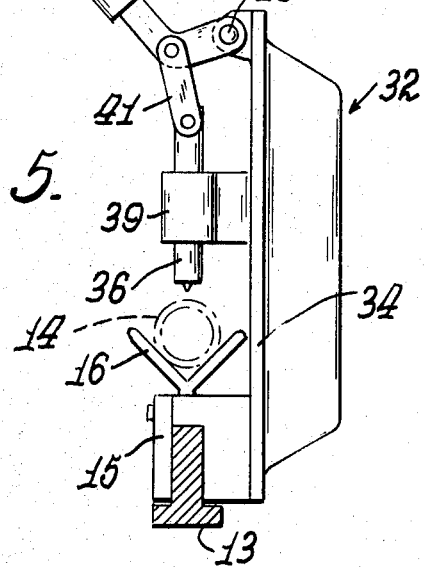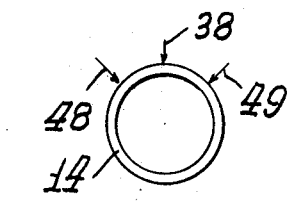

3,561,126
APPARATUS FOR MARKING BEND LOCATIONS ON TUBULAR STOCK
George F. Beckwell, Aurora, Ill., assignor to Pines Engineering Co., Inc., Aurora, Ill., a corporation of Illinois
Continuation of application Ser. No. 645,126, June 12, 1967. This application Aug. 6, 1969, Ser. No. 861,213
Int. Cl. B23b 49/02
U.S. Cl. 33—189                 12 Claims

ABSTRACT OF THE DISCLOSURE

Apparatus for laying out reference points for bends to be made in tubular stock, which includes a support for such stock and a visual calibrated reader connected with said stock for indicating its rotational position on the support. The apparatus also includes means slidable along the length of the stock for facilitating marking of points of reference on said stock.

---

This application is a streamlined continuation of my copending application Ser. No. 645,126, now abandoned, filed June 12, 1967.

This invention relates to improvements in apparatus useful in laying out reference points on tubular or rod stock, or the like, representative of the location and planes of bends to be performed in such stock.

In the tube bending art it is common practice to perform a number of bends at spaced locations on and in different planes in a length of stock. Such bends are performed, for example but not by way of limitation, in the exhaust conduit or tail pipe of an automobile exhaust system. Such multiple bending as now practiced, involves the individual calibration and layout on each length of stock of the location of each bend, or, if performed in automatically controlled bending machines, it necessitates the preparation of a coded index control card or tape. The present invention is most useful in instances where only one or a limited number of lengths of stock are to be bent at one time or at times subsequent to the bending of an initial length of stock.

The herein disclosed apparatus affords graphic means for manually indexing the location of proposed bends on a length of stock of any diameter within the limits of the apparatus, which indexing can be repeated with extreme accuracy on additional pieces of stock. It contemplates the use of the apparatus to hold the stock for free rotation about its axis and means associated with the mounted piece of stock for affording a visual index of its position in the apparatus. Also, means is provided for indexing a novel marking element longitudinally therealong.

It is, therefore, an object of the invention to provide an indexing apparatus of the character referred to.

Another object is to provide such an apparatus with novel means for projecting an enlargement of a calibrated index indicia on a viewing screen.

Another object is to provide such an apparatus with a scale coincidental with the length of the stock being marked.

Another object is to provide apparatus of the character referred to which is adaptable to receiving stock of different diameters.

Another object is to provide apparatus of the character referred to which is not expensive or difficult to manufacture, or maintain in serviceable condition, is extremely accurate and economical in use, easy to use and very efficient.

The structure by means of which the above noted objects and advantages of the invention are attained will be described in the following specification taken in conjunction with the accompanying drawings, showing a preferred illustrative embodiment of the invention, in which:

FIG. 1 is a front elevational view of the apparatus;
FIIG. 2 is a plan view of one end thereof, as viewed on line 2—2 of FIG. 1;
FIG. 3 is an enlarged sectional elevational view taken substantially on line 3—3 of FIG. 2;
FIG. 4 is a plan view of the screen, showing an image projected thereon;
FIG. 5 is a side elevational view of the marking implement, as viewed along line 5—5 of FIG. 2;
FIG. 6 is a schematic view of a marked length of stock; and,
FIG. 7 is a diagrammatic view of a piece of stock illustrating the location of representative markings thereon.

The apparatus illustrated in an exemplary form in the accompanying drawings is of any practical length and it includes at least a pair of upstanding supports 11 each mounting a bracket 12 upon which is mounted for limited vertical adjustment a horizontal guide bar 13. This guide bar preferably is substantially heavy so as to support thereon the load of a length of tubular or rod stock 14, or the like. For this purpose, the bar 13 has slidable therealong a pair of support brackets 15 each having a substantially V-shaped cradle 16 on its upper surface. These cradles receive and support the length of stock 14 in such manner that it may be freely rotated manually about its longitudinal axis for a purpose presently to be made apparent.

The stock is supported at an elevation from the bar 13 to enable one end thereof to be engaged firmly by a chuck 17 arranged at one end of the described assembly. This chuck is carried on an end of a horizontal shaft 18 that is journalled for free rotation in a rigid bearing 19 carried adjacent to the upper end of the related upstanding support 11. The other end of said shaft 18 mounts firmly a transparent disc 21 (FIG. 3) having protractor indicia on its peripheral margin.

As best shown in FIG. 3, the disc 21 is enclosed in a box-like casing 22 which has on its inclined upper end, on the side facing the chuck, a translucent screen 23. Mounted within the casing 22, preferably on a strap 24, is a lamp housing 25 having a source of illumination 26 therein and a lens assembly 27 spaced therefrom in a position to receive and project a light beam from the source of illumination onto a reflector surface, such as mirror 28, which in turn reflects the beam onto the translucent screen 23. The peripheral margin of disc 21 is disposed in the space between lamp housing 25 and its lens assembly 27 so that protractor readings thereon are enlarged and projected onto the screen 23 as shown at 29 in FIG. 4.

Insofar as the apparatus has been described, when a length of stock 14 is seccured in chuck 17, the whole is rotated to cause the "zero" indicia of the protractor indicia to register with an index marking 31 on the screen. It is evident that upon rotating the stock about its longitudinal axis, a degree of rotation reading will be instantly displayed on the screen owing to rotation of the disc 21. Thus, for example, should the stock be rotated a quarter of a revolution, the reading on the screen will be 90°, and, if rotated a half revolution, the reading on the screen will be 180°.

Now, with a length of stock 14 laid in the cradles 16 and connected to the chuck 17, let it be assumed that an index of bend is to be marked thereon at say 16 inches from the lead or secured end of the stock. A marking fixture 32, to be described in detail presently, is advanced along the bar 13 a distance of 16 inches. For this purpose, the bar carries on its upper surface an inch scale 33 starting in line with the face of chuck 17.

This marking fixture is best shown in FIGS. 1, 2 and 5. It comprises one of the support brackets 15 that is slideable along the bar 13. Extending upwardly from one side of said bracket is an upright 34 that carries a pair of marking devices. In the present disclosure one of the devices is a marking pen 35 whereas the other device is a denting tool 36. Both of these devices overlie vertical radii of the length of stock. The marking pen 35 is carried in a sleeve 37 having a coil spring therein that normally functions to hold the pen clear of the stock. It now being desired to mark the stock at the 16 inch point, the pen is depressed to contact the stock and leave an indelible imprint thereon such as the dot 38 indicated in FIG. 6. Should dimpling be desired, the denting tool 36 is actuated.

As best shown in FIG. 5, the denting tool 36 is reciprocable in a boss 39 formed on the front side of upright 34. Its upper end is connected to a link 41 which in turn is connected to a hand level 42 pivotally mounted on the upright as at 43. By pulling down on lever 42, the denting tool engages and dimples the stock.

Because the marking pen 35 and dimpling tool 36 are longitudinally spaced apart in the direction of the length of the stock, it is necessary to provide two separate index markings on the marking fixture for register with the scale markings 33 on bar 13. This is best illustrated in FIGS. 1 and 2 where there is shown, on the marking fixture, a longitudinally extending lug 44. The lug has an extension 45 pivotally connected therewith. The lug and the extension each bear a line indicia 46 and 47 respectively, spaced apart a distance equal to the spacing between the marking pen and the dimpling tool. When the marking pen is to be used, the indicia 46 on the extension 45 is registered with the 16 inch scale markin. When the dimpling tool is to be used, the extension 45 is folded down and the line indicia 47 is then placed in register with the 16 inch scale marking. In either instance, the mark on or dimple in the stock will be 16 inches from the chuck-held end of the stock.

The user, having previously determined the location and plane of additional bends to be performed, will now move the marking fixture 32 a distance responding to the location of the second bend. Should, for example, the location of the second bend be 20 inches from the first bend, the marking fixture 32 will be advanced away from the chuck to the 36 inch marking on scale 33. Assuming the second bend to be in a plane 45° from the plane of the first bend, the tubing 14 is rotated in the proper direction to carry the 45° protractor image in register with the indicia 31 on screen 23. The marking fixture then is actuated, as before, to mark the tubing as shown at 48 in FIGS. 6 and 7. A third bend marking can, for example, be made 30 inches from the second bend marking and in a plane 45° on the opposite side from the first bend marking 38 by rotating the tubing 90° from the second bend marking and sliding the marking fixture 32 along the beam to the 66 inch scale marking. The implement is then acctuated to generate the bend location as at 49. Repositioning of the stock and the marking fixture can be repeated to generate as many bend locations as required. It should be apparent also, that by keeping a record of the spacing and planes of proposed bends, the sequence can be repeated as often as required to mark a required number of lengths of stock in identical manners.

Although I have described a preferred embodiment of the invention, in considerable detail, it will be understood that the description thereof is intended to be illustrative, rather than restrictive, as details of the structure may be modified or changed without departing from the spirit or scope of the invention. Accordingly, I do not desire to be restricted to the exact construction described.

I claim:

1. Apparatus to locate reference points of bends to be formed in a length of tubular stock, comprising:
   means to support said length of stock for rotation about its longitudinal axis;
   a visual reader operably associated with said stock support means and connectable with the stock for indicating the angle of the stock with respect to a reference plane;
   a marking fixture movable longitudinally with respect to said stock support means along a length of stock carried thereby, said marking fixture being fixed with respect to said reference plane; and
   means for indicating the longitudinal position of said marking fixture on said stock support means, with respect to a length of stock carried thereby.

2. The apparatus in claim 1 wherein said support means includes:
   a pair of spaced apart stands,
   a bar extending between said stands and supported thereby,
   a stock support attached to said bar, and
   a second stock support slidable along said bar.

3. The apparatus of claim 2 wherein said bar is vertically adjustable on said stands.

4. The apparatus in claim 2 wherein said marking fixture is mounted on said second stock support.

5. The apparatus of claim 1 wherein said visual reader comprises:
   a protractor disc movable in response to the rotation of said stock about its longitudinal axis,
   mirror means,
   a light source to project in the image of a protractor reading onto said mirror means, and
   a screen onto which said image is projected by said mirror means.

6. The apparatus in claim 5 wherein said light source includes a lamp housing disposed on one side of said protractor disc and a lens assembly disposed on the other side of said protractor disc.

7. The apparatus in claim 1 wherein said marking fixture includes a stock support and means for marking a reference point on said stock and wherein said means for marking engages the stock opposite said support.

8. The apparatus in claim 7 wherein said means for marking a reference point includes an inking tool.

9. The apparatus in claim 7 wherein said means for marking a reference point includes a dimpling tool.

10. The apparatus in claim 1 wherein said means for indicating the longitudinal distance along said stock includes a bar disposed below and parallel with a length of stock and having measuring calibrations along its length.

11. The apparatus in claim 10 wherein said marking fixture includes indicia to register with selected calibrations on said bar.

12. The apparatus of claim 1 including a rotatable chuck in which the stock is received and means connecting the visual reader with said chuck.

References Cited

UNITED STATES PATENTS

| | | | |
|---|---|---|---|
| 1,566,509 | 12/1925 | Schwanz | 33—189 |
| 1,974,606 | 9/1934 | Fassin | 33—125(O) |
| 2,221,577 | 11/1940 | Dinkel | 33—19(B) |
| 2,641,160 | 6/1953 | Mihalakis | 116—116(X) |
| 2,943,595 | 7/1960 | Atwood | 116—116 |
| 2,951,462 | 9/1960 | Wikes et al. | 116—116 |
| 3,108,378 | 10/1963 | Rantsch | 33—1(O) |
| 3,125,904 | 3/1964 | Olivieri | 33—19(BX) |

FOREIGN PATENTS

| | | | |
|---|---|---|---|
| 141,097 | 2/1881 | France | 77—5(LM) |

WILLIAM D. MARTIN, JR., Primary Examiner

U.S. Cl. X.R.

33—1, 75; 116—116